Jan. 5, 1971   T. J. KOPROWSKI   3,552,195
VANE SHEAR DEVICE
Filed Dec. 13, 1968   2 Sheets-Sheet 1
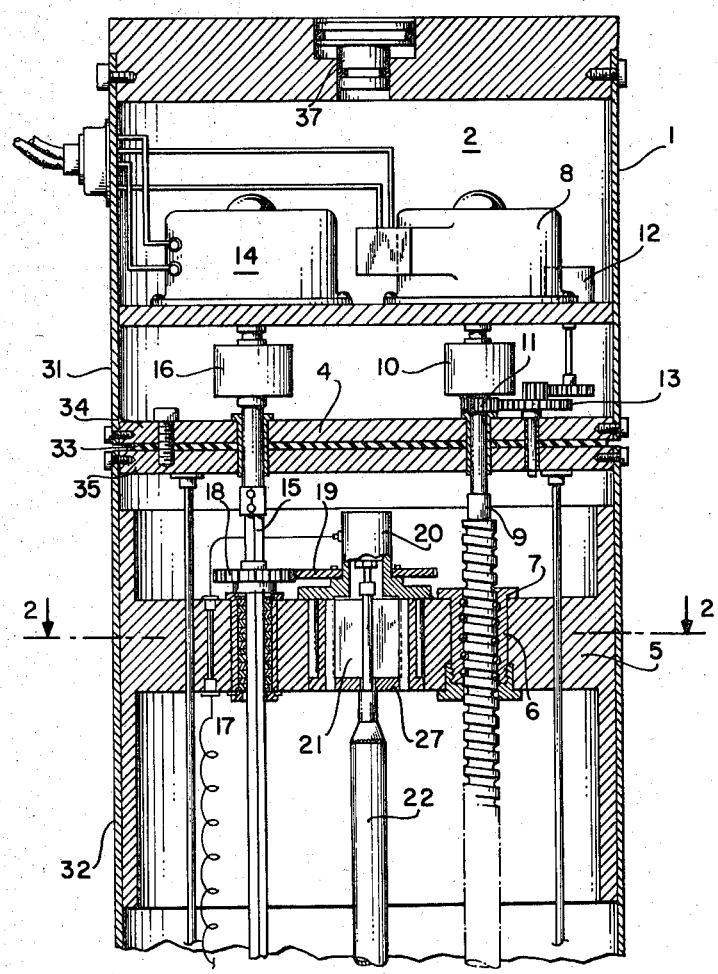
FIG_1
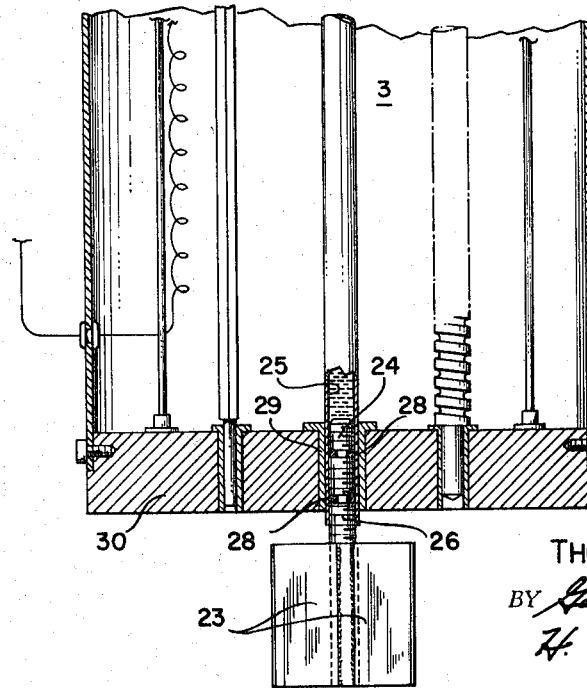
INVENTOR.
THOMAS J. KOPROWSKI
BY George C Sullivan agent
H. Donald Volk
Attorney Jan. 5, 1971  T. J. KOPROWSKI  3,552,195
VANE SHEAR DEVICE
Filed Dec. 13, 1968  2 Sheets-Sheet 2
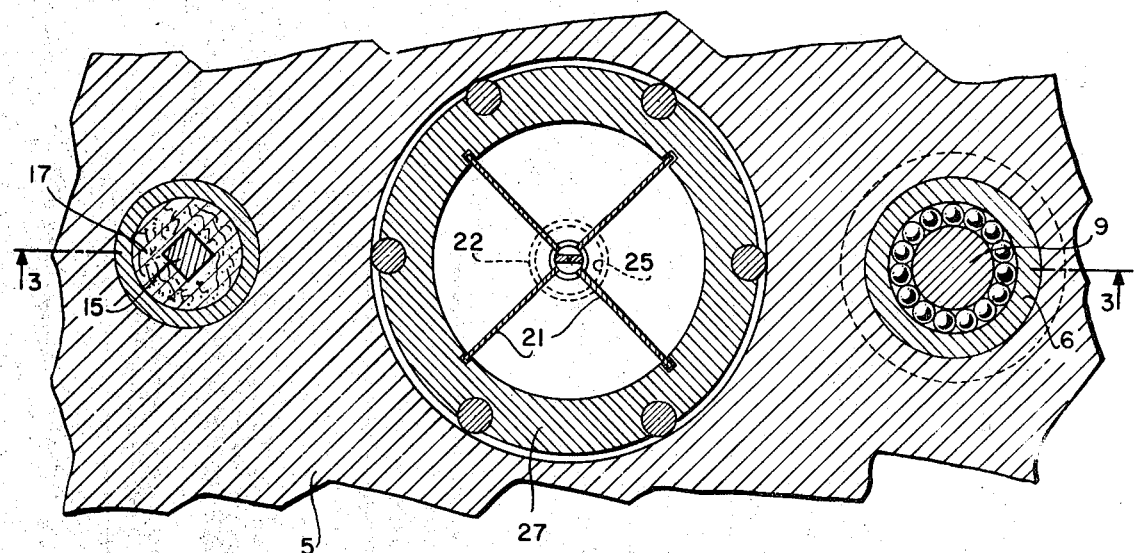
FIG_ 2
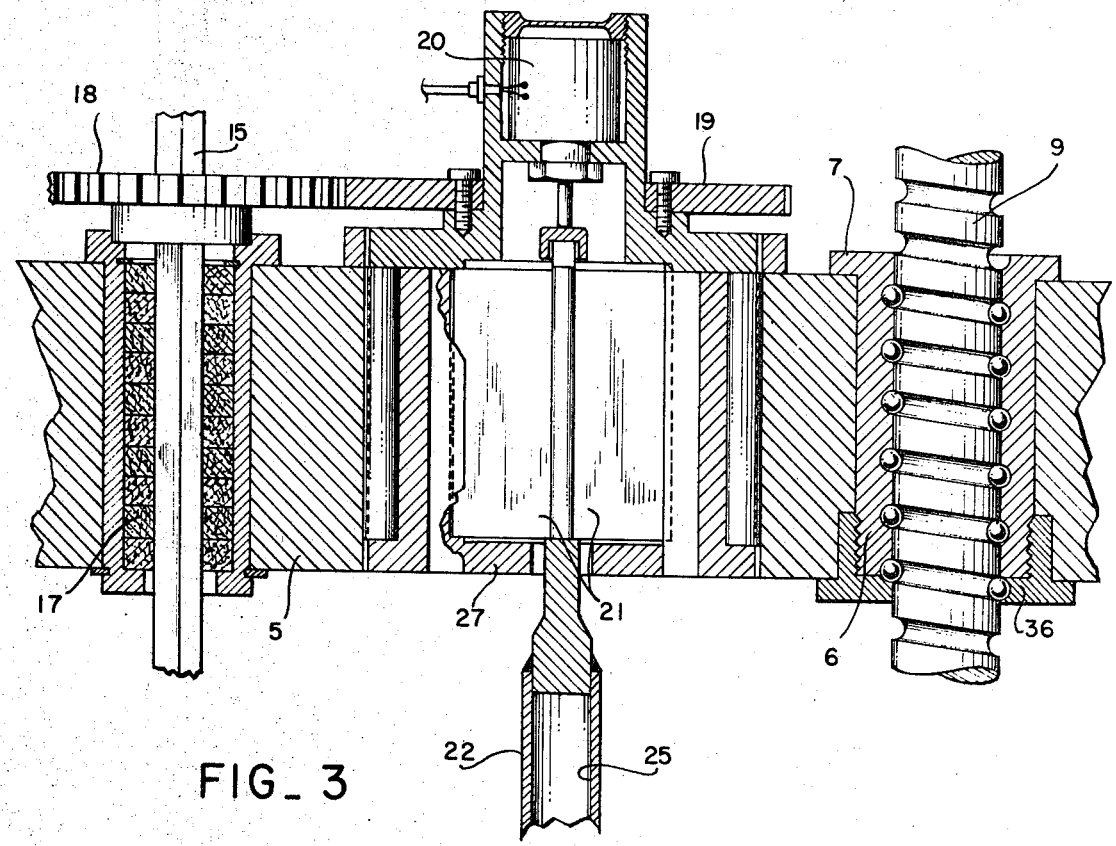
FIG_ 3
*INVENTOR.*
THOMAS J. KOPROWSKI
BY George C. Sullivan, agent
H. Donald Volk
Attorney

United States Patent Office 3,552,195
Patented Jan. 5, 1971

3,552,195
VANE SHEAR DEVICE
Thomas J. Koprowski, Agoura, Calif., assignor to Lockheed Aircraft Corporation, Burbank, Calif.
Filed Dec. 13, 1968, Ser. No. 783,592
Int. Cl. G01n 3/24
U.S. Cl. 73—101                            4 Claims

ABSTRACT OF THE DISCLOSURE

A device capable of being remotely controlled to measure the shear strength of sediment in an aquatic environment is disclosed. A constant torque is induced by a motor through a kinetic energy device, such as spring vanes, into a paddle on the end of a oil pressurized shaft. When the bottom sediment resists the torque the potentiometer monitors the relative rotation between the motor rotation and the shaft paddle. The torque application rate, the yield point, the strain rate, and the ultimate shear of the sediment can be recorded.

BACKGROUND OF THE INVENTION

This invention relates to an aquatic bottom sediment testing instrument. More particularly, the invention concerns torsional vane shear strength testing apparatus to determine characteristics of bottom sediment at controlled insertion distance at locations that can be preselected.

One of the most critical mass physical properties of soils and marine sediment is its shear strength. This property is used to determine the degree to which the soil will be able to support or retain in place piles, foundation structures, and the like. Shear strength is also important in determining the stability of the sea floor slope with regard to failure by sliding or flowing.

Heretofore, tests to determine the physical properties of sediment have been carried out both in the laboratory and directly in the field. For laboratory tests, samples of the sediment must be removed from the bottom and transported to the laboratory. These samples are susceptible to damage, making it hard to obtain accurate results. Moreover, the actual pressures which exist around the sediment in place cannot be maintained during the extraction of the sediment from the earth surface, thus adding to the inaccuracies.

There are several types of apparatus employed in the field for making thests of soils. However, a vane shear device is one of the most convenient for measuring marine sediment because of its adaptability to in-site testing. Most other methods require elaborate equipment which can only be used in a laboratory on a relatively small sample of the material. The vane shear test consists of inserting a vane into the soil to be tested and measuring the torque required to rotate the vane and shear a cylinder of soil. It is an undrained test in the sense that the pore water trapped in the pores of the sample is not given time to migrate out of the sediment being tested.

It is the object of the invention to provide an improved vane shear testing apparatus which is compact and portable, and which will accurately measure the shearing resistance of the soil in place.

Another object of the invention is to provide an improved vane shear device that can be remotely controlled from either the surface or from a submersible.

Yet another object of the invention is the provision of a vane shear device having a minimum deflection during insertion, thereby assuring minimal disturbance to the surrounding sediment.

Still another object of the invention is the use of spring vanes as a torque transfer media to assure accurate results.

The above and other objects of the vane shear device according to the present invention will appear from the following detailed description thereof, in which reference is had to the accompanying drawings illustrating a preferred embodiment of the invention, wherein:

FIG. 1 is a vertical section, showing the preferred example of the apparatus according to the invention.

FIG. 2 is a broken horizontal section approximately along line 2—2 of FIG. 1.

FIG. 3 is an enlarged broken vertical section approximately along line 3—3 of FIG. 2.

Referring more particularly to the drawings, FIG. 1 shows a preferred embodiment of the present invention. The support casing 1, which consists of upper casing 31 and lower casing 32 is divided into a motor compartment 2 and main compartment 3 by bulkhead 4. Bulkhead 4 consists of a piece of neoprene 33 sandwiched between upper plate 34 and lower plate 35 which are rigidly attached to upper casing 31 and lower casing 32 respectively.

Motor compartment 2 is filled with a fluid, such as oil, and is pressure compensated by a stepped piston 37 or any other well known means so that the interior of the motor compartment is maintained at a pressure slightly above the ambient pressure.

A motor 8 for extending and retracting the piston is mounted within motor compartment 2 and rigidly affixed thereto. Motor 8 is preferably a synchronous AC motor but may be any other type of electric motor without departing from the scope of the invention. Attached to motor 8 is a ball screw shaft 9 that cooperates with the ball screw nut 6 in piston 5. Interspaced between motor 8 and ball screw shaft 9 is a slip clutch 10 and a gear 11. A depth indicator potentiometer 12 is connected through gear train 13 to gear 11.

A torque motor 14 is mounted in motor compartment 2. Torque motor 14 is preferably a synchronous AC motor. A square torque drive shaft 15 is connected to torque motor 14 through slip clutch 16.

FIGS. 2 and 3 show a ball screw nut 6 retained in a bore in the piston head 5 by a flange 7 and a lock nut 36 or any other well known means that will prevent rotation of the ball screw nut relative to the piston.

A slide bushing 17 is affixed to piston 5 and guides square torque shaft 15 through piston 5. A torque drive gear 18, which cooperates with square torque shaft 15, is attached to piston 5. Torque drive gear 18 meshes with a spindle gear 19. A pressure compensated potentiometer 20 is rigidly attached to spindle gear 19.

One end of a series of spring vanes 21 slide in axial slots in housing 27 to which the spindle gear 19 is affixed. Paddle shaft 22 is rigidly attached to the other end of spring vanes 21. As can be seen in FIG. 1, a paddle 23, which may consist of two blades egg-crated to form a four blade paddle, is attached to the lower end of paddle shaft 22. A threaded pressurizing piston 24 is moveably mounted and sealed by seal 28 within the cavity 25 of paddle shaft 22 for pressurizing the oil within the cavity 25.

In order to increase the stiffness of the paddle shaft 22 without increasing its outside diameter, which would disturb the surrounding sediment, oil is put into the cavity 25 and pressurized by torquing the threaded piston 24 to predetermined torque valves or by welding after an axial force is applied.

In operation, the vane shear device is positioned over the sediment to be tested and the support casing is rigidly affixed in a submersible or on a tripod or any other well known means so that it cannot rotate. Power is then applied to motor 8, which causes rotation of ball screw shaft 9. This forces piston 5 downward carrying with it the associated gear including paddle 23 through bushing 29 which is secured by any well known means in the bottom end cap 30. Power is disconnected when the paddle has reached the predetermined depth. A constant torque is then applied to the paddle by torque motor 14 and the associated gears which rotates housing 27. When the housing 27 rotates, it deflects the spring vanes 21. Housing 27 is mounted for rotation by roller bearings, not shown, or any other well known means. This minimizes variations in deflection rate due to temperature changes because of the relatively short length and because the spring vanes are slideably mounted and not rigidly affixed at the outer ends. When the torque is sufficient to overcome the shearing resistance of the sediment, the vane begins to rotate in the direction of the applied torque. The relative rotation betwene paddle shaft 22 and the housing including the slots for spring vanes 21 is measured by the potentiometer 20 as a change in resistance. This relative motion is a function of the actual stress enduced to the sediment. The amount of rotation is monitored as a function of time, from a time prior to the actual rotation of the paddle until the time after the paddle vane rotates in the sediment. A curve showing the stress versus the amount of the vane rotation can then be plotted.

Although the disclosed vane shear device is designed for underwater use, it is not so limited since it will find utility any place where size and weight are critical and remote operation is desired.

Other modifications and advantageous applications of this invention will become apparent to those having ordinary skill in the art. Therefore, it is intended that the matter contained in the foregoing description and the accompanying drawings be interpreted as illustrative and not limitative, the scope of the invention being defined by the appended claims.

What is claimed is:

1. Apparatus for testing the characteristics of sediment comprising:
   a vane shear paddle,
   a paddle shaft having first and second ends,
   said first end of said paddle shaft being rigidly affixed to said vane shear paddle,
   a cylindrical casing,
   a slideable piston within said casing,
   said second end of said paddle shaft being rotatably mounted to said slideable piston,
   means attached to said slideable piston for moving said piston, said paddle shaft and said paddle, as a unit, relative to said cylindrical casing,
   and turning means for imparting torsional force to said paddle shaft and said paddle,
   means operatively connected to said turning means for indicating the torque required to effect such turning, thereby to provide a measure of the resistance to movement of the sediment,
   said cylindrical casing is further defined as including a fluid filled compartment, and
   said turning means is mounted within said fluid filled compartment.

2. The apparatus according to claim 1 further including:
   means for maintaining said fluid filled compartment at a pressure greater than the ambient pressure at the exterior of said fluid filled compartment.

3. Apparatus for testing the characteristics of sediment comprising:
   a vane shear paddle,
   a paddle shaft having first and second ends,
   said first end of said paddle shaft being rigidly affixed to said vane shear paddle,
   a cylindrical casing,
   a slideable piston within said casing,
   said second end of said paddle shaft being rotatably mounted to said slideable piston,
   means attached to said slideable piston for moving said piston, said paddle shaft and said paddle, as a unit, relative to said cylindrical casing,
   and turning means for imparting torsional force to said paddle shaft and said paddle,
   means operatively connected to said turning means for indicating the torque required to effect such turning, thereby to provide a measure of the resistance to movement of the sediment,
   said paddle shaft is further defined as including a pressurized fluid filled compartment.

4. The apparatus according to claim 3 wherein:
   said cylindrical casing is further defined as including a fluid filled compartment,
   said turning means is mounted within said compartment in said cylindrical casing, and
   means for maintaining said compartment in said cylindrical casing at a pressure greater than the ambient pressure at the exterior of said cylindrical casing.

References Cited
UNITED STATES PATENTS

| | | | |
|---|---|---|---|
| 2,603,967 | 7/1952 | Carlson | 73—101 |
| 3,465,576 | 9/1969 | Spanski | 73—101 |

JERRY W. MYRACLE, Primary Examiner

U.S. Cl. X.R.

73—59